(12) United States Patent
Frisken

(10) Patent No.: US 10,677,994 B2
(45) Date of Patent: Jun. 9, 2020

(54) CALIBRATION SYSTEM FOR A WAVELENGTH SELECTIVE SWITCH

(71) Applicant: Finisar Corporation, Horsham, PA (US)

(72) Inventor: Steven James Frisken, Vaucluse (AU)

(73) Assignee: II-VI Delaware, Inc., Wilmington, DE (US)

(*) Notice: Subject to any disclaimer, the term of this patent is extended or adjusted under 35 U.S.C. 154(b) by 749 days.

(21) Appl. No.: 15/121,929

(22) PCT Filed: Mar. 2, 2015

(86) PCT No.: PCT/US2015/018322
§ 371 (c)(1),
(2) Date: Aug. 26, 2016

(87) PCT Pub. No.: WO2015/134393
PCT Pub. Date: Sep. 11, 2015

(65) Prior Publication Data
US 2017/0075075 A1 Mar. 16, 2017

Related U.S. Application Data

(60) Provisional application No. 61/947,991, filed on Mar. 4, 2014.

(51) Int. Cl.
*G02B 6/35* (2006.01)
*G02B 26/08* (2006.01)
*H04Q 11/00* (2006.01)

(52) U.S. Cl.
CPC ......... *G02B 6/3588* (2013.01); *G02B 6/3512* (2013.01); *G02B 26/0833* (2013.01);
(Continued)

(58) Field of Classification Search
CPC ............... G02B 6/3588; G02B 6/3512; G02B 26/0833; H04Q 2011/0026; H04Q 2011/0039; H04Q 2011/0083
(Continued)

(56) References Cited

U.S. PATENT DOCUMENTS 5,742,720 A 4/1998 Kobayashi et al.
7,092,599 B2 8/2006 Frisken
(Continued)

FOREIGN PATENT DOCUMENTS

JP 2004-294978 A 10/2004
WO 2014015129 A1 1/2014

OTHER PUBLICATIONS

"Notification of Transmittal of the International Search Report and the Written Opinion of the International Searching Authority, or the Declaration" For International Patent Application No. PCT/US2015/018322, dated Jun. 5, 2015, 19 pages, International Searching Authority, Korean Intellectual Property Office, Daejeon Metropolitan City, Republic of Korea.
Notification Concerning Transmittal of International Preliminary Report on Patentability (Chapter I of the Patent Cooperation Treaty), For International Patent Application No. PCT/US2015/018322, dated Sep. 15, 2016, 15 pages, The International Bureau of WIPO, Geneva, Switzerland.

*Primary Examiner* — Kimberly N. Kakalec
(74) *Attorney, Agent, or Firm* — Kurt Rauschenbach; Rauschenbach Patent Law Group, PLLC

(57) ABSTRACT

Described herein is a calibration system (25) for a wavelength selective switch (1). The switch (1) is adapted for dynamically switching optical beams (5, 7) along respective trajectories between input and output ports disposed in an array (3) using a reconfigurable Liquid crystal on silicon (LCOS) spatial light modulator device (17). The calibration system (25) includes a monitor (27) for projecting an optical monitor beam (29) through at least a portion of the switch (1) onto the LCOS (17) and detecting the monitor beam (29) reflected from the LCOS (17). In response, system (25)
(Continued)

provides a calibration signal (33) to an active correction unit (35) for applying a correction to one or more of the trajectories while maintaining a constant switching state in the LCOS (17).

20 Claims, 11 Drawing Sheets

(52) U.S. Cl.
CPC ............... *H04Q 2011/0026* (2013.01); *H04Q 2011/0039* (2013.01); *H04Q 2011/0083* (2013.01)

(58) Field of Classification Search
USPC ............. 359/205.1, 207.7, 207.8; 385/24, 27
See application file for complete search history.

(56) References Cited

U.S. PATENT DOCUMENTS

| | | | |
|---|---|---|---|
| 8,131,123 B2* | 3/2012 | Presley | G02B 6/29311 385/16 |
| 9,654,848 B2* | 5/2017 | Frisken | G02B 6/3512 |
| 2003/0206685 A1 | 11/2003 | Huang et al. | |
| 2007/0104424 A1 | 5/2007 | Takeuchi et al. | |
| 2008/0008415 A1* | 1/2008 | Davis | G02B 6/29311 385/18 |
| 2008/0159705 A1 | 7/2008 | Takeuchi et al. | |
| 2015/0208143 A1* | 7/2015 | Frisken | G02B 6/3512 398/48 |

* cited by examiner

CALIBRATION SYSTEM FOR A WAVELENGTH SELECTIVE SWITCH

CROSS-REFERENCE TO RELATED APPLICATION

This application is a 35 U.S.C. § 371 application based on PCT/US15/18322 filed Mar. 2, 2015, entitled "A Calibration System for a Wavelength Selective Switch" which claims priority to U.S. Provisional Patent Application Ser. No. 61/947,991, filed Mar. 4, 2014, entitled "A Calibration System for a Wavelength Selective Switch". The entire disclosures of PCT Patent Application PCT/US15/18322 and U.S. Provisional Patent Application Ser. No. 61/947,991 and are incorporated herein by reference.

FIELD OF THE INVENTION

The present invention relates to optical switching devices and in particular to a calibration system for a wavelength selective switch. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Liquid crystal on silicon (LCOS) based wavelength selective switches (WSS) have been developed based on highly stabilized optical trains. In a push for minimizing the height (profile) of WSS components (single-slot applications) there is a requirement to reduce the stability and thermal shielding of the components.

Previous known approaches introduce an optical inversion into the optical system to maintain the required stability over temperature and mechanical aberrations. However, these approaches have not been able to be scaled to higher functionality devices such as dual devices or high port count devices.

One suggested approach is to look at using the ability of the LCOS device to readjust and steer the light to overcome the change in alignment. However, this is problematic because it changes the image of the LCOS, giving rise to problems such as:

Transient changes to the port isolation which can be poorly controlled.
Difficulties in ensuring calibrations are valid across all operating conditions.
Significant variations in the orders of the switching and attenuation images occur as alignment changes, so an uncontrolled order may emerge as a port isolation issue.

SUMMARY OF THE INVENTION

It is an object of the invention, in its preferred form to provide an improved or alternative calibration system for a wavelength selective switch.

In accordance with a first aspect of the present invention there is provided a calibration system for a wavelength selective switch, the switch being adapted for dynamically switching optical beams along respective trajectories between input and output ports disposed in an array using a reconfigurable spatial light modulator device, the system including:

a monitor for projecting an optical monitor beam through at least a portion of the wavelength selective switch onto the spatial light modulator and detecting the monitor beam reflected from the spatial light modulator device and, in response, providing a calibration signal; and an active correction unit responsive to the calibration signal for applying a correction to one or more of the trajectories.

Preferably, the same correction is applied simultaneously to each of the respective trajectories. The correction preferably includes a predefined spatial offset of the optical beams at the output ports. The spatial offset of the optical beams is preferably in a switching dimension being a direction of switching by the spatial light modulator device.

The wavelength selective switch preferably includes a wavelength dispersive element for spatially dispersing the optical beams in a dispersion dimension and wherein the spatial offset of the optical beams is in the dispersion dimension.

The active correction unit preferably provides control to a beam switching module including:

an electrically controllable mirror tiltable at a number of predefined angles; and an optical power element having a focal length f and being positioned at a distance f from both array and the mirror to convert the angular correction of the trajectories to a corresponding spatial offset in a dimension of the array.

The active correction unit preferably includes a control for the spatial light modulator for selectively modifying a background slope image while maintaining the current switching state.

The wavelength dispersive element is preferably a grism and the active correction unit includes a temperature controller for controlling the temperature of the grism.

The monitor beam is preferably projected from a first monitor port in the array and received in a second monitor port in the array. The first and second monitor ports are preferably the same port. The monitor beam is preferably projected onto a predetermined region of the spatial light modulator.

The monitor preferably includes:

a light source for directing the monitor beam onto the predetermined region;

a controller for electrically controlling cells within the predetermined region to selectively direct the monitor beam along a monitoring trajectory relative to a switching trajectory; and a detector for detecting the optical power of the beam directed along the monitoring trajectory.

The light source preferably produces a monitor beam having a predetermined wavelength. The light source is preferably a wavelength locked laser. The light source preferably includes a tunable element for selectively defining the predetermined wavelength of the monitor beam. The tunable element is preferably a Fabry-Perot etalon.

The controller is preferably adapted to:

apply first and second ramp steering images across at least a subset of the cells within the predetermined region to reflect the optical monitor beam at respective first and second angles to the detector; and upon detection of the optical power levels of the optical monitor beam at the first and second angles by the detector, produce the monitor beam based on the difference in the optical power levels.

The predetermined region is preferably located in a peripheral region of the spatial light modulator. The spatial light modulator is preferably an LCOS device.

The active correction unit preferably applies the correction to the one or more trajectories while maintaining a constant switching state in the spatial light modulator.

In accordance with a second aspect of the present invention, there is provided a calibration method for a wavelength selective switch, the switch being adapted for dynamically switching optical beams along respective trajectories between input and output ports disposed in an array using a reconfigurable spatial light modulator device, the method including:
  projecting an optical monitor beam through at least a portion of the wavelength selective switch onto the spatial light modulator;
  detecting the monitor beam reflected from the spatial light modulator device and, in response, providing a calibration signal; and
  in response to the calibration signal, applying a correction to one or more of the trajectories while maintaining a constant switching state in the spatial light modulator.

In accordance with a third aspect of the present invention, there is provided a monitor device for a wavelength selective switch, the switch being adapted for dynamically switching optical beams along respective trajectories between input and output ports disposed in an array using a reconfigurable liquid crystal spatial light modulator device, the monitor including:
  a monitor for monitoring predetermined characteristics of one or more of the optical beams; and
  an active feedback controller responsive to the monitor for simultaneously correcting for more than one of the beam alignment, wavelength position and liquid crystal optical flicker.

In accordance with a fourth aspect of the present invention, there is provided a monitoring method for a wavelength selective switch, the switch being adapted for dynamically switching optical beams along respective trajectories between input and output ports disposed in an array using a reconfigurable liquid crystal spatial light modulator device, the method including:
  monitoring predetermined characteristics of one or more of the optical beams; and
  in response to the monitoring, simultaneously correcting for more than one of the beam alignment, wavelength position and liquid crystal optical flicker.

In accordance with a fifth aspect of the present invention, there is provided an optical system including:
  one or more input ports for projecting input optical beams into the system;
  a spatial light modulator including a plurality of cells, each cell being independently electrically drivable at one of a number of predefined states for, in conjunction with other cells, diffracting the optical beams into at least a zero diffraction order and a higher diffraction order and selectively steering the diffraction orders along predetermined trajectories;
  a monitor for detecting the trajectory of one or more diffraction orders; and
  one or more output ports for receiving predetermined diffraction orders.

The spatial light modulator is preferably responsive to a monitor signal issued by the monitor for selectively adjusting the trajectory of one or more diffraction orders of a first optical beam with respect to a diffraction order of another optical beam.

The spatial light modulator is preferably responsive to a monitor signal issued by the monitor for collocating a diffraction order for more than one optical beam at the one or more output ports.

In accordance with a sixth aspect of the present invention, there is provided an optical fiber mount including:
  a base having a two dimensional upper surface; and
  a plurality of v-shaped grooves disposed in the upper surface of the base, each adapted for receiving an optical fiber, the grooves being spaced apart in a first dimension and extending parallel to each other in a second dimension perpendicular to the first dimension;
  wherein the grooves are symmetrically disposed about a central axis in the first dimension and the spacing between predetermined fiber pairs in the first dimension is different.

A first subset of the grooves is preferably spaced apart in the first dimension by a first distance and a second subset of the grooves is spaced apart in the second dimension by a second distance. The first distance is preferably 250 µm. The second distance is preferably 375 µm.

The fiber mount preferably includes twenty grooves for receiving up to twenty optical fibers. The central axis is preferably situated 500 µm from the nearest neighboring fibers.

In accordance with a seventh aspect of the present invention, there is provided a calibration system for monitoring the operation of a pixelated optical phased array structure, the system including:
  a first laser for projecting a reference signal onto a portion of the pixelated optical phased array structure,
  a sensor for monitoring the return reference signal therefrom,
  a control system for adjustment of position of phase patterns based on the sensed return signal.

The pixelated optical phased array structure preferably forms part of an optical system having a series of input/output ports, an optical dispersion device and optical power elements and wherein an input signal from the input/output ports is projected through each of the optical dispersion device and optical power elements.

The light signal preferably follows a path through the optical elements relative to the input signal.

The input signal is preferably incident onto the pixelated optical phased array structure in a first region and the reference signal is incident onto the pixelated optical phased array structure in a second region separate to the first region. The first laser is preferably tunable.

BRIEF DESCRIPTION OF THE DRAWINGS

Preferred embodiments of the disclosure will now be described, by way of example only, with reference to the accompanying drawings in which.

DETAILED DESCRIPTION

System Overview

Preferred embodiments of the present invention have been developed for use in dual source wavelength selective switch (WSS) devices. An exemplary WSS device incorporating two independent optical sources will initially be described with reference to FIG. 1. However, it will be appreciated that the embodiments described herein are applicable to other types of WSS devices such as single source devices and even, in some cases, to other types of optical switches.

Figure 1:
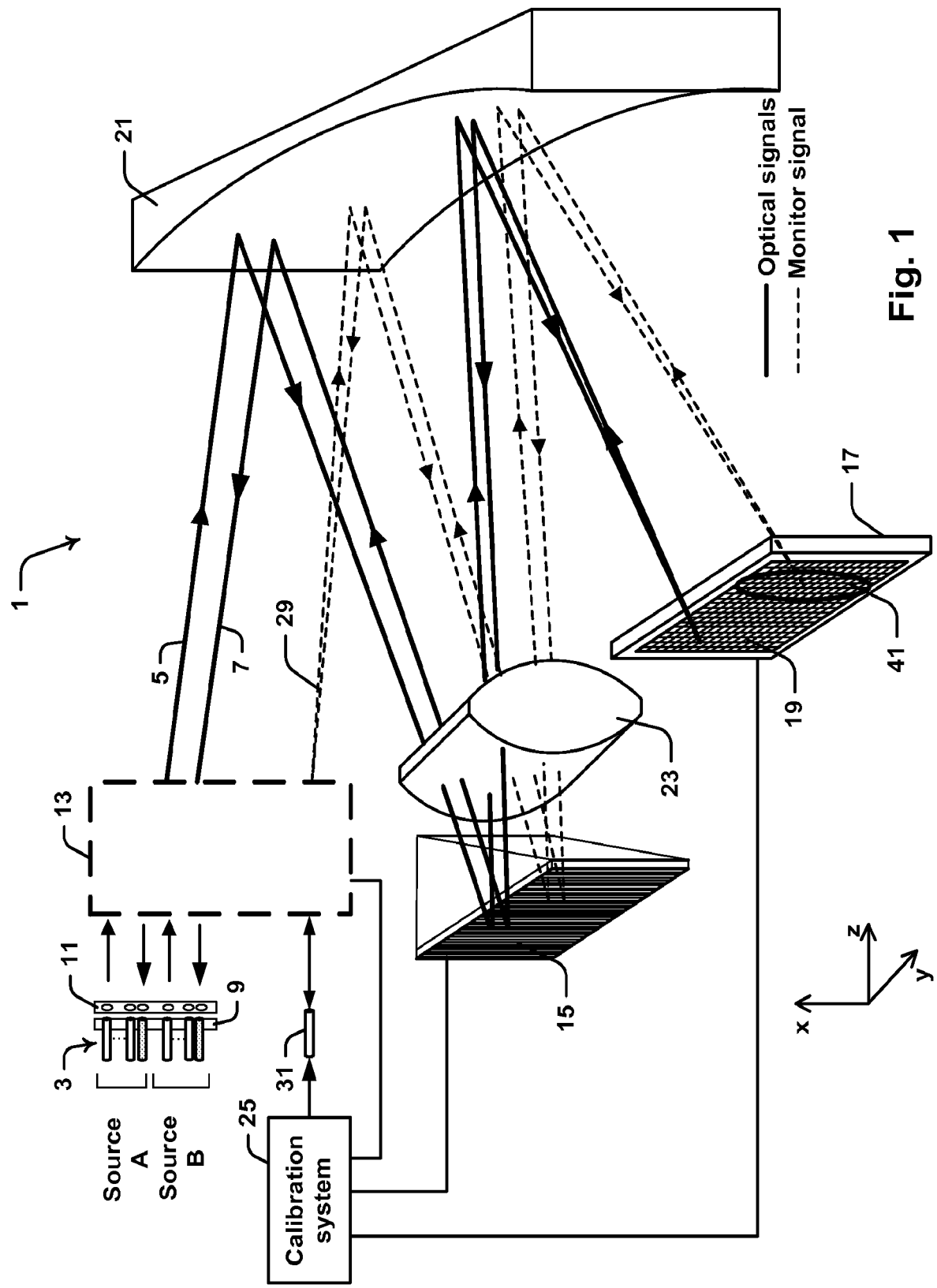
FIG. 1 is a schematic perspective view of a WSS according to an embodiment of the invention.

Referring initially to FIG. 1, WSS device 1 includes an array 3 of optical fibers comprising both input optical fibers (common ports) for projecting input optical beams 5 indicative of wavelength division multiplexed optical signals and output optical fibers (add/drop ports) for receiving output optical beams 7 indicative of individual wavelength channels. Array 3 is divided into fibers sourcing beams from two different independent optical sources: Source A and Source B. Ends of fibers in array 3 are mounted in a fiber v-groove array 9 and project respective optical beams through corresponding micro-lenses of a micro-lens array 11 disposed opposite the fiber ends. Micro-lenses of array 11 are cylindrical or spherical or a series combination of cylindrical and spherical in profile and act to define a beam waist of the initially diverging beams emerging from fibers of array 3. In other WSS devices, different combinations of input and output fiber ports are used depending on the particular application.

A front end 13 of WSS 1 includes various components for preprocessing the input optical beams from both sources including polarization control and beam alignment. A diffractive grism 15 spatially separates individual wavelength channels from the input optical beams in a dispersion plane (x-y plane in FIG. 1). A reconfigurable liquid crystal on silicon (LCOS) spatial light modulator 17 includes a two dimensional array of individually electrically drivable pixels or cells 19 and is configured to individually processes the wavelength channels to dynamically switch the channels along respective trajectories in a switching plane (x-z plane in FIG. 1) between the input and output fibers. Curved mirror 21 and lens 23 provide appropriate focusing and collimation of the beams throughout WSS 1 in a similar manner to that described in U.S. Pat. No. 7,092,599 to Frisken entitled "Wavelength Manipulation System and Method" and assigned to Finisar Corporation.

Figure 2:
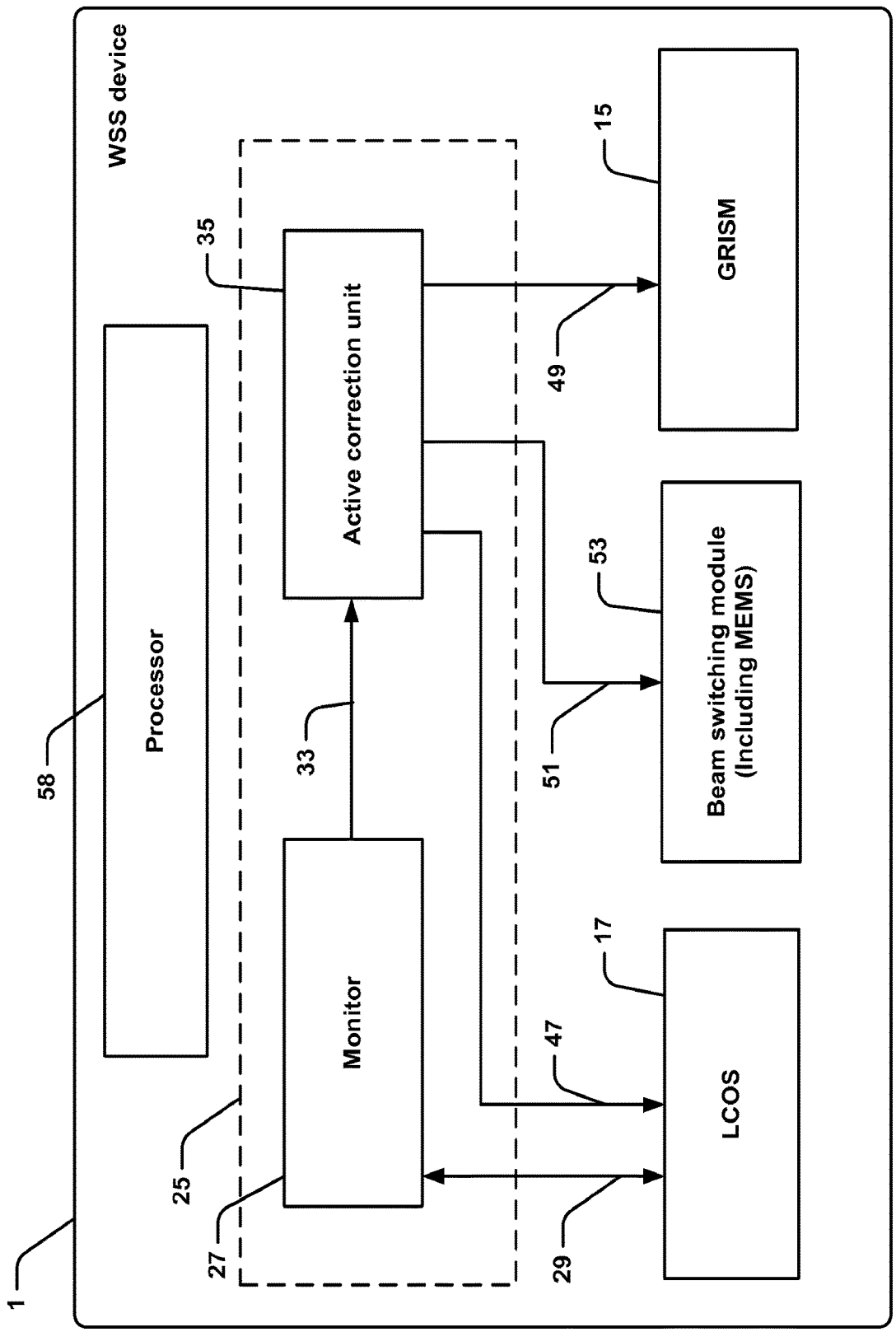
FIG. 2 is a schematic functional view of the WSS of FIG. 1 showing communication between a calibration system and other components within the WSS.

Referring to FIG. 2, WSS 1 includes a locked calibration system 25 for dynamically adjusting the alignment of the optical trajectories with respect to the optical fibers to correct for optical misalignments due to thermal and mechanical instabilities.

With reference to both FIGS. 1 and 2, locked calibration system 25 includes a monitor 27 for projecting an optical monitor beam 29 through WSS 1 onto LCOS 17 and for detecting monitor beam 29 reflected from LCOS 17. Monitor beam 29 is projected from a first monitor fiber 31 in or adjacent array 3 and received at the same fiber upon reflection from LCOS 17. In another embodiment, monitor beam 29 is projected from a first fiber and received at a second fiber that is separate to the first fiber. In response to the received monitor beam, monitor 27 provides a calibration signal 33 to an active correction unit 35. In response to the received calibration signal 33, unit 35 calculates an appropriate correction to one or more of the trajectories in one or both of the switching plane and the dispersion plane. This correction is applied by transmitting a correction signal to one or more optical elements within WSS 1 while maintaining a predefined switching state in LCOS 17. A predefined switching state relates to a predefined LCOS steering image or function defined by states of cells within a region of the LCOS to steer an optical beam from one fiber to another specific fiber. The one or more elements for which the correction can be applied include grism 15, LCOS 17 and an electrically controllable micro-electromechanical mirror (MEMS) that is located within front end 13. The MEMS mirror is described in detail below.

Figure 3:
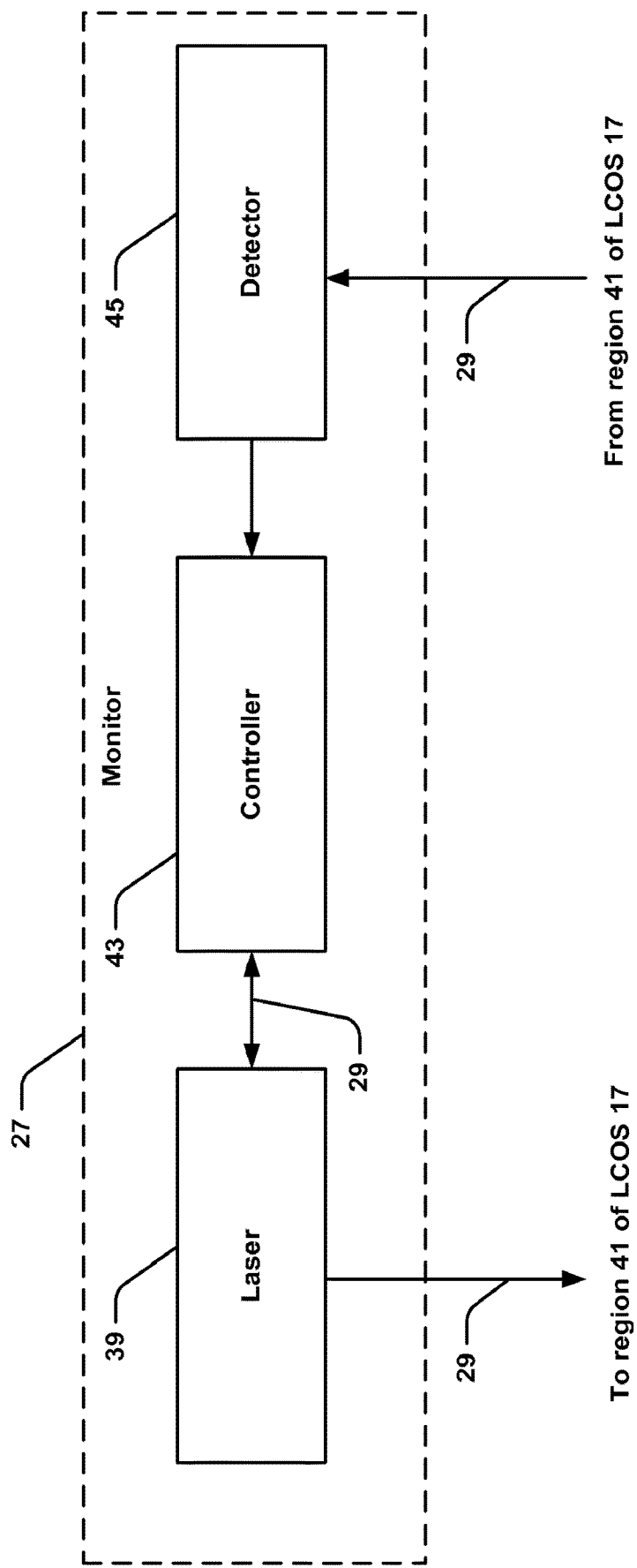
FIG. 3 is a schematic functional view of a monitor device of a calibration system within the WSS of FIGS. 1 and 2.

Referring to FIG. 3, monitor 27 includes a light source in the form of a wavelength locked distributed feedback laser 39 for directing monitor beam 29 onto a predetermined reference region 41 of LCOS 17. Reference region 41 is preferably located in a peripheral region of LCOS 17 so as to avoid interference with the routine switching of the wavelength channels, which typically occurs in a central region. In another embodiment, reference region 41 corresponds to an unused channel region on LCOS 17. Reference region 41 encompasses a plurality of liquid crystal cells 19 and is similar in shape and size to other wavelength channel regions on LCOS 17. However, in other embodiments, reference region 41 is smaller or larger than other wavelength channel regions. Beam 29 emitted by laser 39 follows an optically similar path as the wavelength channels being switched, but is incident onto LCOS 17 in reference region 41.

In other embodiments, other types of laser are used including tunable semiconductor lasers. Referring still to FIG. 3, monitor 27 also includes a controller 43 for electrically controlling cells within reference region 41 to selectively direct monitor beam 29 along a monitoring trajectory relative to the switching trajectories and back to monitor fiber 31. A detector 45, including at least one photodiode, detects the optical power of monitor beam 29 directed along the monitoring trajectory and feeds this optical power data back to controller 43.

Laser 39 produces beam 29 having a predetermined reference wavelength defined by a wavelength discriminating element in the form of a Fabry-Perot etalon (not shown).

Referring again to FIG. 2, locked calibration system 25 includes an LCOS control line 47 for providing a first feedback control signal from active correction unit 35 to LCOS 17. The first feedback control signal selectively modifies a background slope image applied to cells 19 of LCOS 17, while maintaining the current LCOS switching state. For example, for a simple ramp function the position of each of the reset points in the switching dimension remains fixed while allowing variations in the phase strength from top to bottom. For context, if the image could be viewed as a grayscale image, a dark-to-light or light-to-dark fading from top to bottom of the screen would be added for a particular region while the overall image structure is kept unchanged. For a phase image this allows very small variations of steering of a beam of light without creating discontinuities in the beam coupling or any of the port isolation terms.

Locked calibration system 25 also includes a temperature control line 49 for sending a second feedback control signal from active correction unit 35 to a temperature controller (not shown) for grism 15. The second control signal selectively controls the temperature of grism 15, which determines the channel wavelength centering in the dispersion plane.

Figure 4:
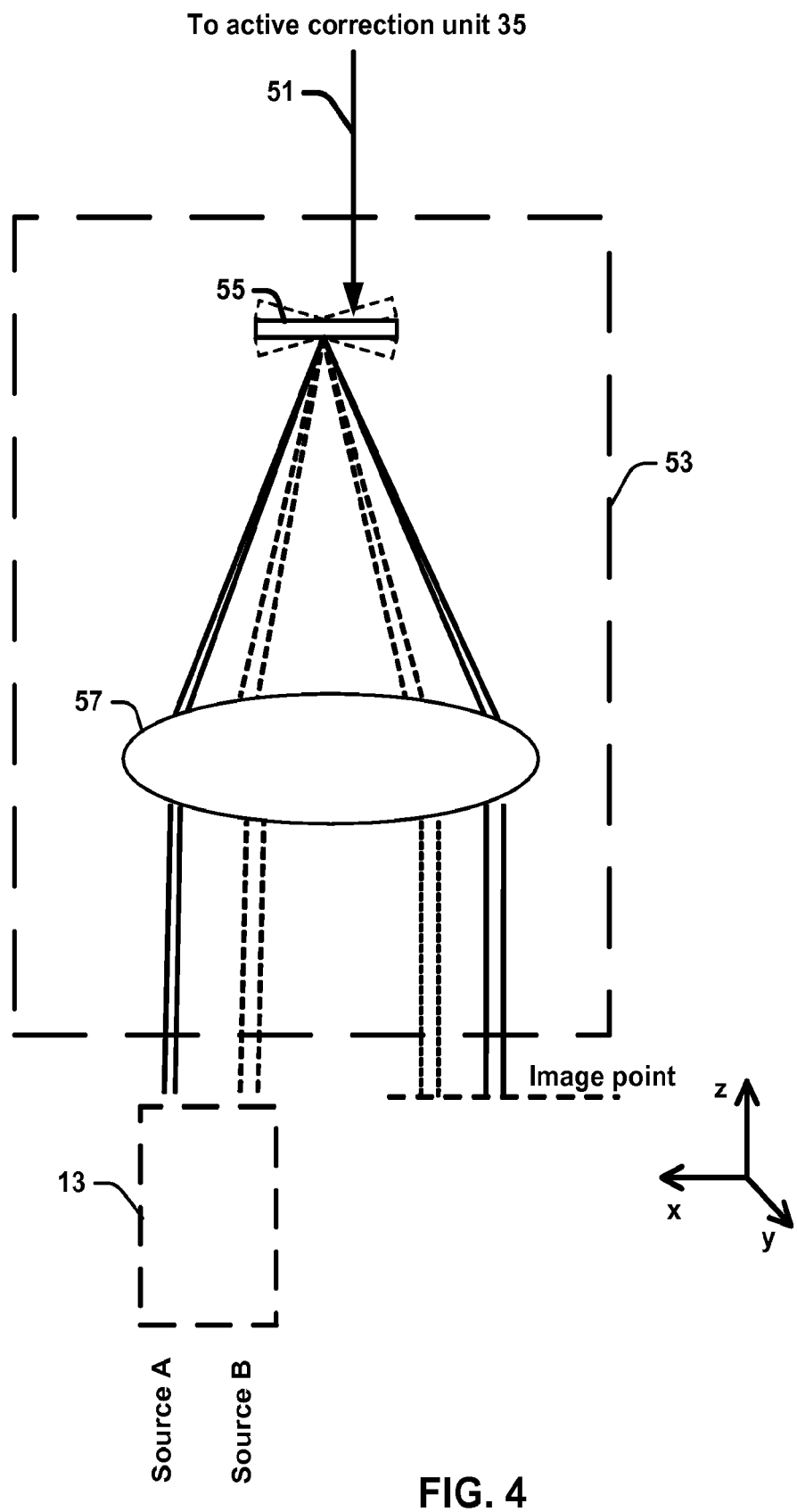
FIG. 4 is a schematic plan view of a beam switching module of the WSS of FIG. 1.

Locked calibration system 25 also includes a switching feedback control line 51 for providing feedback from active correction unit 35 to a beam switching module 53 disposed within front end 13. As illustrated in FIG. 4, module 53 includes an electrically controllable MEMS 55 that is electronically tiltable at a number of predefined angles in the switching plane (x-z plane in FIG. 4) to selectively direct the optical beams in a similar manner to that described in PCT Application Publication WO/2014/015129 to Frisken entitled "Polarization Diverse Wavelength Selective Switch" and assigned to Finisar Corporation. In an exemplary embodiment, MEMS 55 is a 1 mm diameter mirror LV VOA MEMS chip manufactured by Precisely Microtechnology Corp.

Switching module 53 also includes an optical power element in the form of a spherical lens 57 having a focal length f. Lens 57 is positioned at a distance f from both micro-lens array 11 and MEMS 55 to convert the angular correction of the beam switching trajectories to a corresponding spatial offset in the switching dimension. The electronic control of MEMS 55 provides an LCOS independent alignment adjustment to center an axis of symmetry of WSS 1 about a nominal position in the switching plane. Electronic control of MEMS 55 is provided from active correction unit 35 through a control line 51, as shown in FIG. 2.

Figure 5:
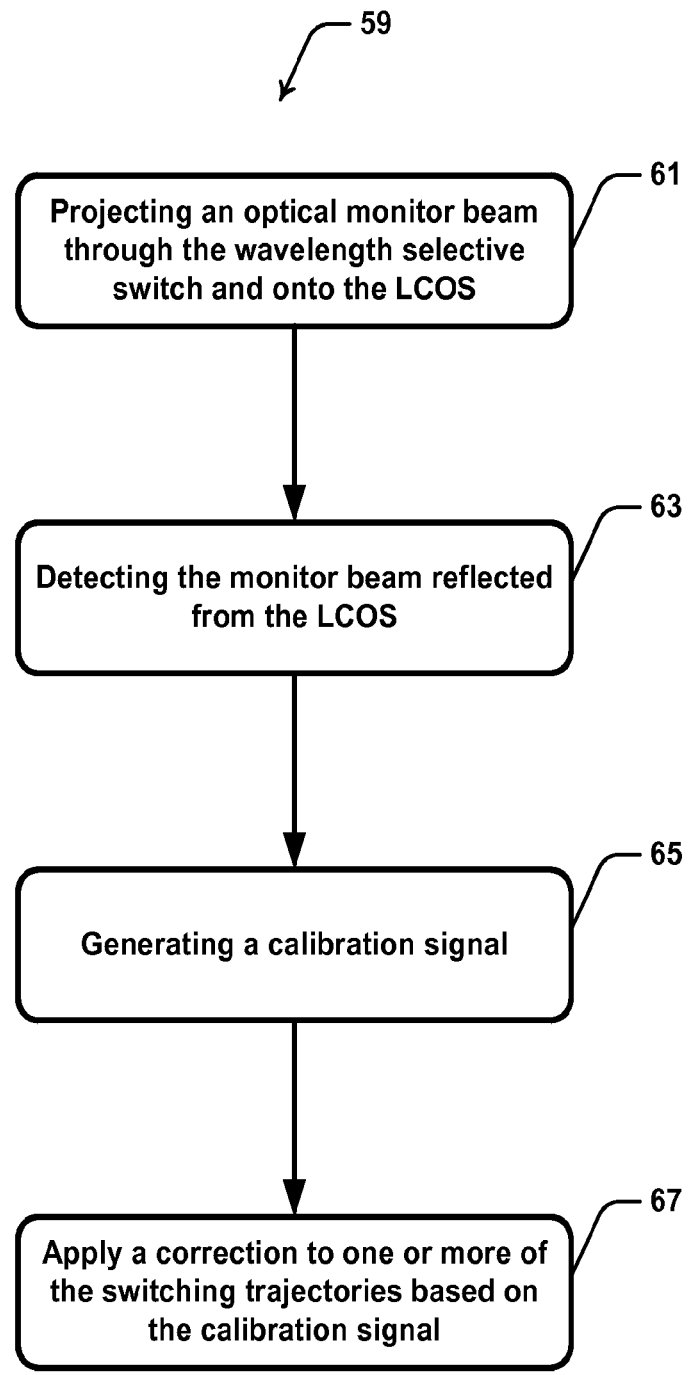
FIG. 5 illustrates a process flow of steps in a method for calibrating optical beams in the WSS of FIGS. 1 and 2.

Referring again to FIG. 2, WSS 1 includes a processor 58 for performing steps of the above calibration procedure. In other embodiments, processor is controlled either wirelessly or through a communications cable by an external computer (not shown). Referring now to FIG. 5, there is illustrated the primary steps of a method 59 for calibrating optical beams in WSS 1. At step 61, processor 58 controls laser 39 to project optical monitor beam 29 through WSS 1 and onto reference region 41 of LCOS 17. Beam 29 is reflected from LCOS 17 along a predetermined monitor trajectory based on the programmed states of cells within reference region 41. At step 63, monitor beam 29 reflected from LCOS 17 is detected by detector 45. In response to the detected signal, at step 65, monitor 27 provides a calibration signal to active correction unit 35. In response to receiving the calibration signal, at step 67, unit 35 applies a correction to one or more of the switching trajectories through corresponding control signals to one or more of LCOS 17, grism 15 and MEMS 55.

In one embodiment, active correction unit 35 is configured to adjust the wavelength channel alignment in both the switching plane and the dispersion plane, as well as reduce the level of optical flicker experienced in LCOS 17.

Figure 6:
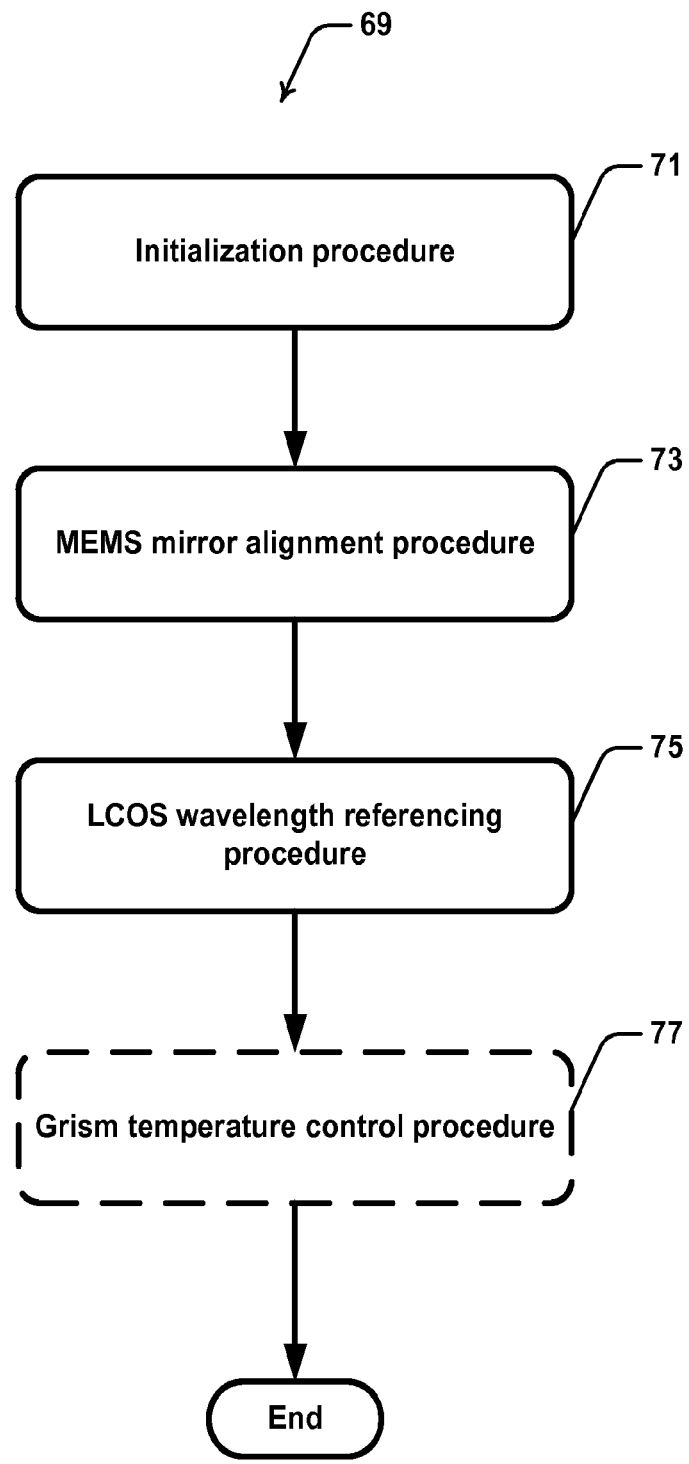
FIG. 6 illustrates a process flow of the steps performed by the WSS of FIGS. 1 and 2 for calibrating optical beams.

At the process level, the general procedure of method 59 is performed as method 69 as illustrated in FIG. 6. At step 71 an initialization procedure is performed. At step 73, a MEMS mirror alignment procedure is performed which sets MEMS 55 to an optimum tilt angle for maximizing the detected power of monitor beam 29. At step 75, an LCOS wavelength referencing procedure is performed. At optional step 77, a grism temperature control procedure is performed. Step 77 is generally only performed if additional adjustment is needed in the dispersion plane after the LCOS calibration.

Figure 7:
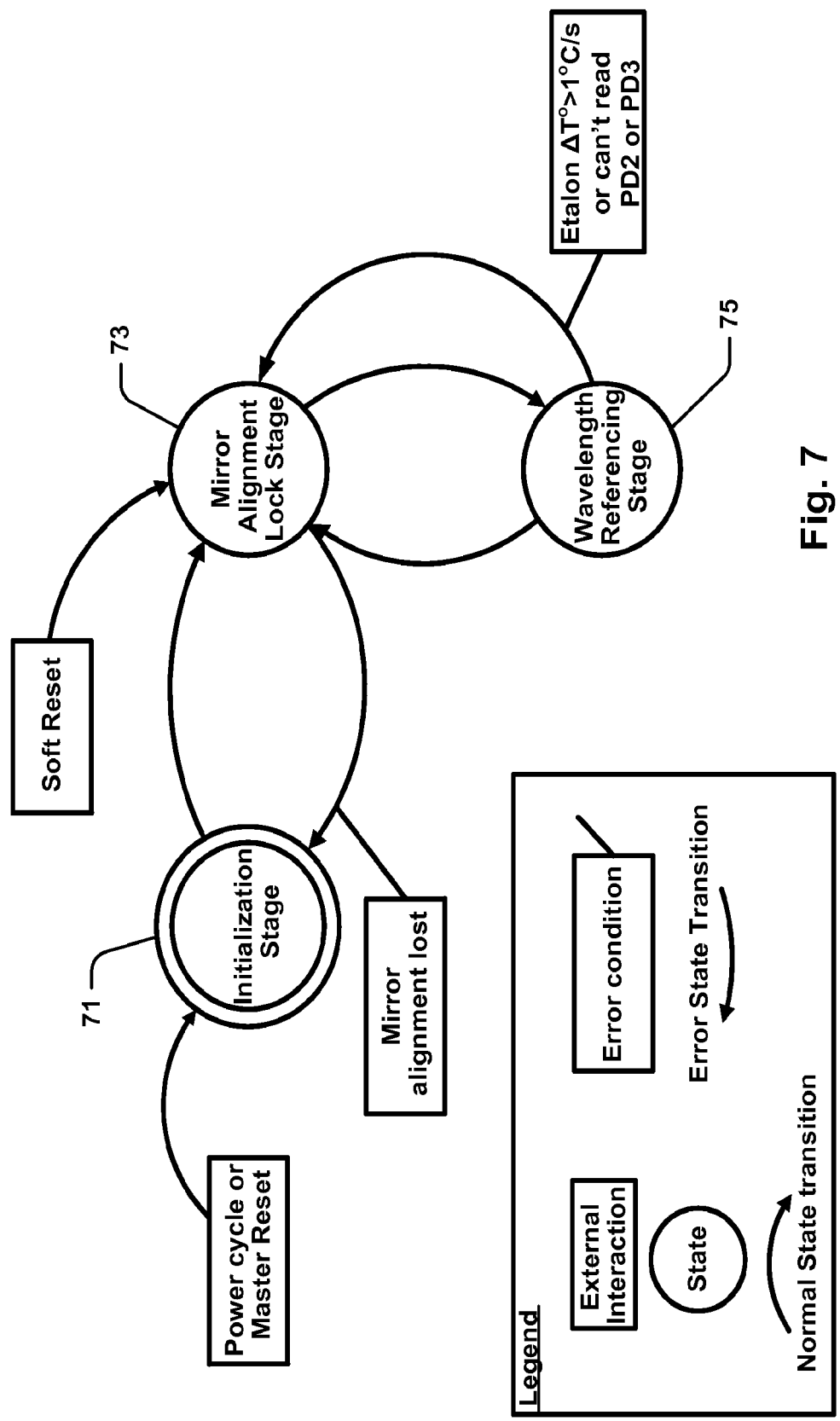
FIG. 7 is a state transition diagram describing the high level flow between the steps of FIG. 6.

Referring to FIG. 7 there is illustrated an exemplary state transition diagram describing the high level flow between the stages described above. After a reset power cycle or master reset occurs, initialization stage (step 71) is performed. This initialization procedure is performed again if the mirror alignment is lost. If a soft reset occurs, the initialization procedure is not required.

Exemplary subroutines for the initialization, MEMS mirror alignment and LCOS wavelength referencing steps are outlined below.

Overview of the Initialization Procedure

The initialization stage has the following goals:
Determine a minimum optical output power for laser 39 required to perform all subsequent operations of MEMS mirror alignment and LCOS wavelength referencing.
Perform a linear scan of the MEMS mirror angle to determine an initial optimum drive voltage (and corresponding optimum tilt angle) that maximize the reflected light.
Characterize and normalize power readings for the Fabry-Perot etalon's transmitted peaks.
Characterize and normalize power readings for the MEMS mirror feedback.

Figure 8:
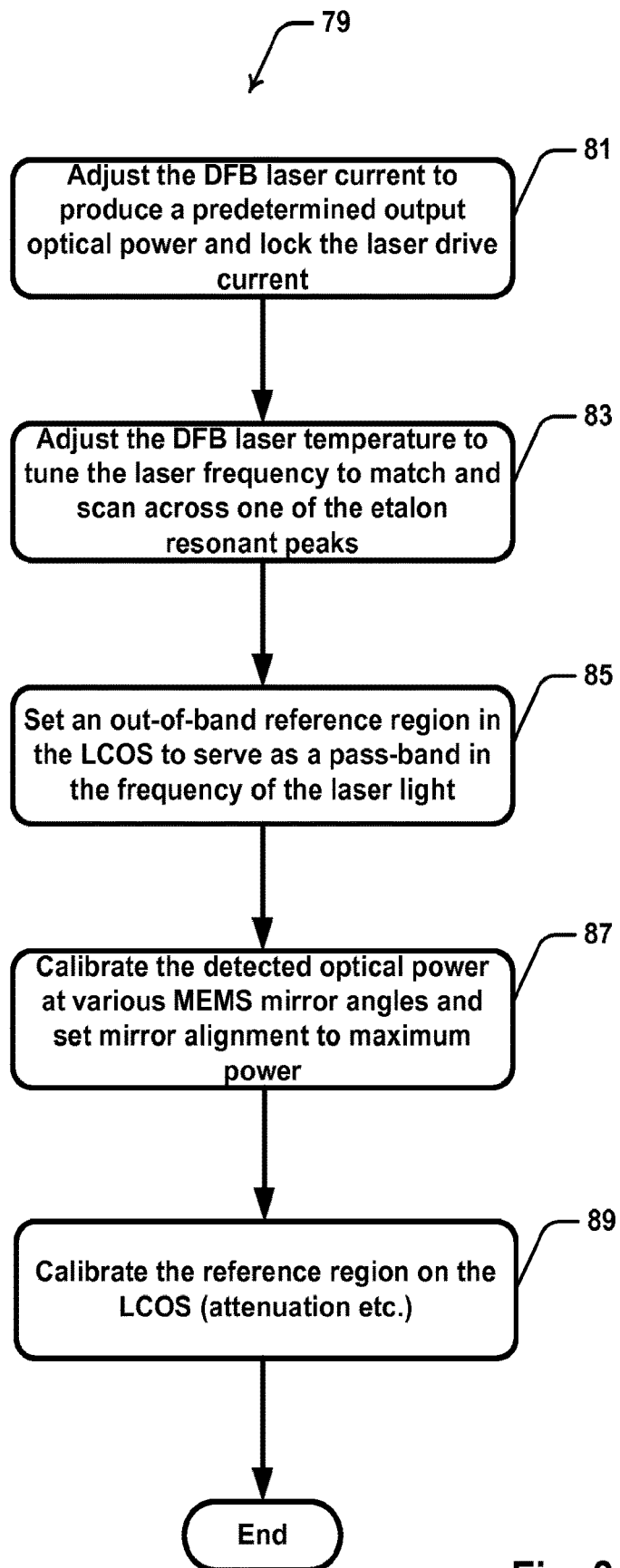
FIG. 8 illustrates the process flow of the initialization process of FIG. 6.

To achieve these goals, initialization procedure 79 of FIG. 8 is performed. At step 81, the drive current of DFB laser 39 is adjusted to produce a predetermined threshold output optical power and lock the laser drive current. By way of example, in this step the output power may be set to an initial power output of about 1 mW. At step 83, the temperature of DFB laser 39 is varied to tune the laser frequency to scan across one of the resonant peaks of the Fabry-Perot etalon. At step 85, the out-of-band reference region 41 in LCOS 17 is allocated to serve as a pass-band in the frequency of the laser light. Here, out-of-band means a frequency range separate from the frequencies of the wavelength channels being switched in WSS 1. The pass-band of reference region 41 is centered on the laser frequency and extends on each side of the laser frequency by a predetermined bandwidth. At step 87, MEMS 55 is driven with a number of drive voltages to tilt the mirror at various angles. During this process, the reflected optical power of laser 39 is detected to calibrate the maximum and minimum powers at the various MEMS mirror angles. The mirror angle is initially set at the angle where a maximum optical power is detected. At step 89, the drive voltages of the various cells within reference region 41 of LCOS 17 are varied and the reflected optical power of laser 39 is measured to calibrate the reference region. Specific levels of attenuation can be applied to produce a desired power level.

At the various steps in procedure 79, if the output power of DFB laser 39 is determined to be too low or too high, the output power is increased or decreased accordingly.

Overview of the MEMS Mirror Alignment

The tilt angle of MEMS 55 controls the position of the beams in the switching dimension. The angular correction provided by MEMS 55 translates to a simultaneous spatial offset to each of the wavelength channel optical beams at the output ports. The primary aim of MEMS 55 is to compensate for thermal changes that affect the optical design of WSS 1.

Figure 9:
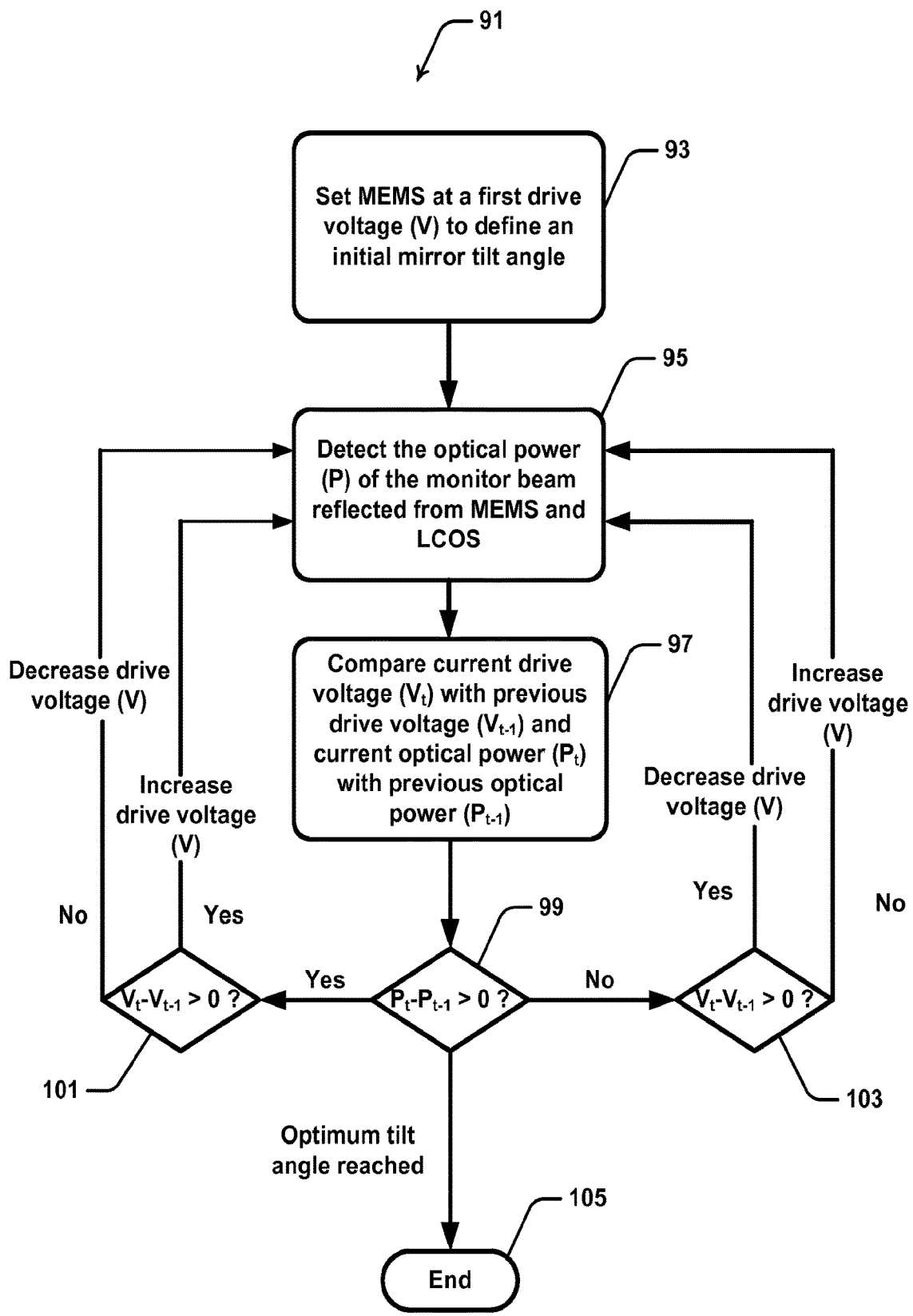
FIG. 9 illustrates the process flow of the MEMS mirror alignment procedure of FIG. 6.

Controller 43 performs a control algorithm for selectively adjusting the angle of MEMS 55 in the switching dimension such that the power of beam 29 sensed by detector 45 is maximized. This corresponds to the mirror angle that optimally corrects for thermal changes in the optics of WSS 1. Determination of an optimal mirror angle is made through controller 43 performing an iterative nonlinear optimization procedure 91 as illustrated in FIG. 9. In another embodiment, an iterative adaptive control procedure is performed to determine the optimal mirror angle.

At initial step 93, MEMS 55 is set to an initial tilt angle in the switching plane by driving MEMS 55 at a first drive voltage (V). The initial tilt angle is typically the angle set during step 87 of initialization process 79. The relationship between the mirror angle and the required voltage is non-linear and is predetermined so that mirror angle is related to drive voltage through a look-up table. Monitor beam 29 is then projected from laser 39 onto MEMS 55, through grism 15 and reflected back from LCOS 17 to detector. At step 95, the optical power (P) of monitor beam 29 is detected at detector 45. As the mirror angle deviates from the optimal angle, the optical power (P) detected by detector 45 falls off nonlinearly. At step 97, controller 43 compares the current drive voltage ($V_t$) with the previous drive voltage ($V_{t-1}$) and the current optical power ($P_t$) with the previous optical power ($P_{t-1}$). This comparison of the power and drive voltage produces four possible outcomes which are progressed by deciding whether to (a) increase the drive voltage, (b) decrease the drive voltage or (c) define the current drive voltage as the drive voltage that produces the optimum tilt angle.

Upon comparison of consecutive power measurements, if the current optical power is determined to be greater than the previous optical power ($P_t - P_{t-1} > 0$), then at step 99 the mirror is determined to be tilting in the direction towards the optimal tilt angle. If the current optical power is determined to be less than the previous optical power ($P_t - P_{t-1} < 0$) then at step 99 the mirror is determined to be tilting in the direction away from the optimal tilt angle.

If the voltage is determined to have increased from the previous step ($V_t - V_{t-1} > 0$) and the power has increased, then at step 101 the voltage is again increased to progress closer to a drive voltage that produces an optimal tilt angle. Similarly, if the voltage is determined to have decreased from the previous step ($V_t - V_{t-1} < 0$) but the power has increased, then at step 101 the voltage is again decreased. If the voltage is determined to have increased from the previous step but the power has decreased, then at step 103 the voltage is reduced. Finally, if the voltage is determined to have decreased from the previous step and the power has decreased, then at step 103 the voltage is increased. The amount of voltage increase or decrease to apply each iteration is proportional to the magnitude of the difference in consecutive power measurements. That is, a large difference in power will result in a larger increase or decrease in the drive voltage. Similarly, a small difference in power will result in a smaller increase or decrease in the drive voltage.

Procedure 91 ends at step 105 when an optimum tilt angle is reached. An optimum tilt angle is specified as a tilt angle that produces an optical power that is equal to or greater than a predefined threshold value, taking into account optical losses. For example, a threshold value for an optimal power might be 1.0 mW. So, if an optical power of 1.1 mW is detected, then procedure 91 is terminated and the current tilt angle is defined as an optimal tilt angle. Until the detected power reaches the optimal power, steps 95 to 103 are repeated iteratively. In an alternative embodiment, the optimum tilt angle is determined when the measured power level drops for voltages either side of a particular drive voltage.

As the control of MEMS 55 occurs during normal operation of WSS 1, tilt control is performed with a view to maximizing controller stability. To reduce mechanical dynamics and allow time for oscillation settling, procedure 91 is preferably performed in discrete time rather than continuous time. Although this control algorithm provides direct coupling optimization, accurate alignment locking can also be achieved without the need to dither the MEMs. To achieve this non optimal alignment of the monitor beam, the LCOS image on either side of the required alignment is varied and the power measured for each of these cases. When the powers are balanced for each misalignment then the rest of the WSS device is in correct alignment.

Overview of the LCOS Calibration

Each spatially separated wavelength channel is incident onto LCOS 17 at a specific region of cells 19. At LCOS 17, each channel is highly elongated in the switching plane by the focal power of lens 23. Accordingly, each specific region allocated to a corresponding channel is similarly elongated having a large number of cells 19 extending in the switching dimension (x-dimension in FIG. 1). During ordinary operation of WSS 1, the cells of each channel region are driven with a steering image along the length of the region so as to steer the wavelength channels in the switching dimension between predetermined input and output fibers.

Although it is possible to overlap these steering images with further calibration images in the switching plane, this adds complexity to the algorithms. By tuning MEMS 55 using the procedure described above, the need to provide calibration in the switching plane with LCOS 17 is greatly reduced. Rather, calibration using the LCOS 17 can be focused on the dispersion plane while maintaining the standard steering patterns in the switching plane.

Through appropriate calibration of LCOS pixels 19 (and temperature control of grism 15), locked calibration system 25 also provides corrective channel position control in the dispersion plane. To achieve this compensation, laser 39 is used as a reference to determine a mapping of wavelength-to-pixel during the lifetime of the WSS. This wavelength-to-pixel mapping is then used by the optical algorithms to calibrate the images drawn in the LCOS to dynamically compensate for wavelength shifts.

Figure 10:
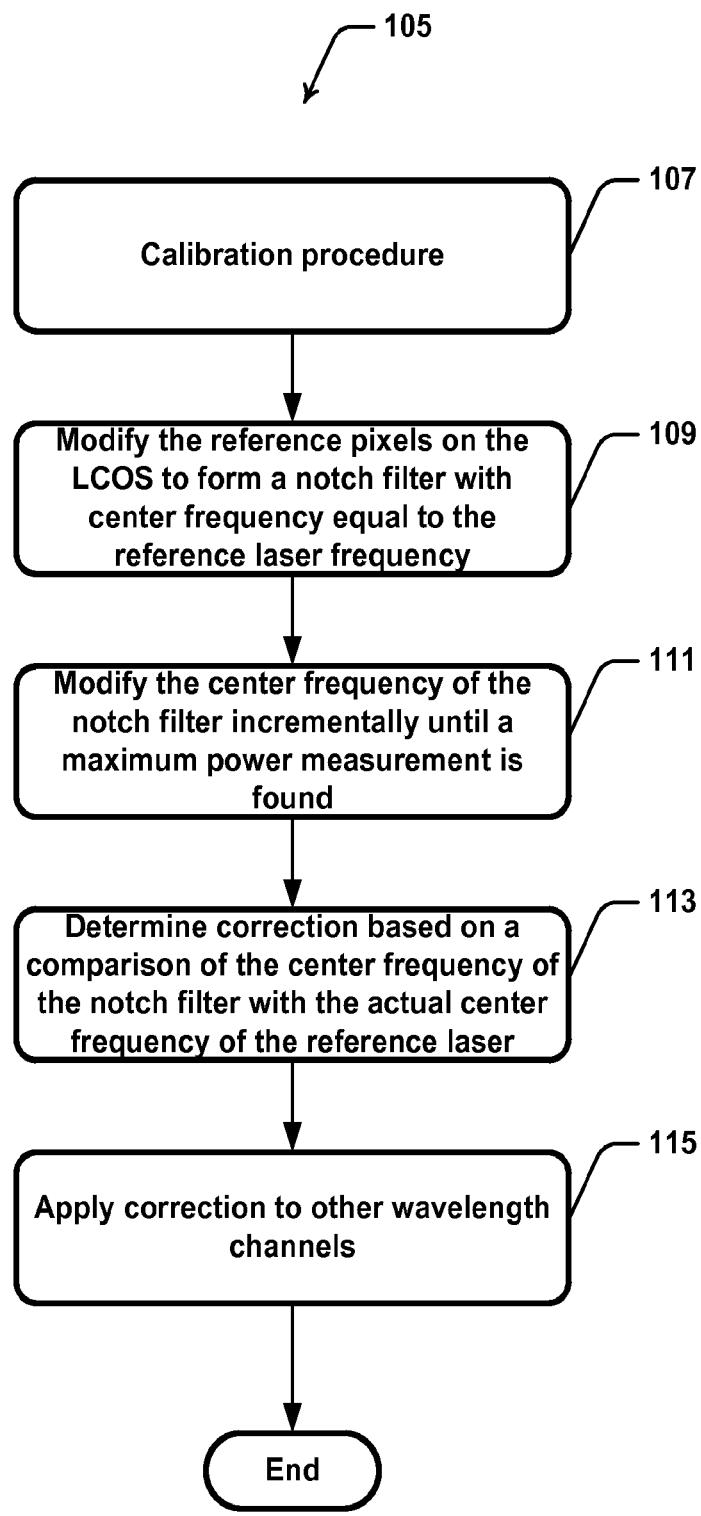
FIG. 10 illustrates the process flow of the LCOS wavelength reference procedure of FIG. 6.

Referring now to FIG. 10, there is illustrated a procedure 105 for determining an LCOS calibration image. Procedure 105 occurs when MEMS 55 is locked at the optimum tilt angle determined from procedure 91 of FIG. 9. The primary purpose of using LCOS calibration images is to compensate for thermal gradients in the optics of WSS 1 and aging effects that cause wavelength shift errors against the nominal ITU grid. These errors are compensated for by dynamically adjusting the LCOS cell states based on a known reference signal (monitor beam 29 from laser 39).

At step 107, a calibration procedure is performed. This includes the following sub-steps:

Tuning the frequency of laser 39 to scan across one of the Fabry-Perot etalon's transmission peaks and normalizing the power detected at detector 45 to a common scale of 0% to 100%. This calibrates for changes related to instabilities in the laser output power and other optical components.

Tuning the laser frequency to a roll-off of a peak in the Fabry-Perot etalon profile, where the maximum power sensitivity is found.

Determining the frequency of the laser light from the detected power reading and measuring the Fabry-Perot etalon's current temperature.

Set the cells of reference region 41 to 0 dB attenuation. Monitor and record the power detected by PD3. This is the 100% power that can be detected during the wavelength referencing stage (ceiling). This calibrates away changes related to aging of laser output power and PD3.

Set the cells of reference region 41 to a blocking mode (maximum attenuation) and monitor and record the power detected. This sub-step determines the 0% power detected or noise floor. This calibrates for changes related to aging of laser output power.

At step 109, the states of liquid crystal cells within reference region 41 are modified in the dispersive plane so as to create an effective spectral notch filter and the received power is detected at detector 45. The notch filter bandwidth is centered on the laser frequency. In an exemplary embodiment, the notch filter has a bandwidth of about 25 GHz and the lower 12.5 GHz is given a 180° phase shift with respect to the upper 12.5 GHz.

At step 111, the center frequency of the notch filter created by the cells of reference region 41 is modified in predefined increments until the detected power is minimized. This represents a position where the center frequency of the notch filter coincides with the laser's center frequency. In an exemplary embodiment the notch filter center frequency is modified in increments of 0.1 GHz. At step 113, the center frequency of the notch filter is recorded and the known center frequency of the laser light is used to determine a correction for correcting the WSS any wavelength registration error against the nominal ITU grid. At step 115, this correction is applied to regions of the LCOS corresponding to other wavelength channels. This includes modifying the state of the liquid crystal cells across a wavelength channel while still maintaining the correct switching state for switching the channel to a predefined output fiber. In some cases, different corrections are required to different wavelengths. These can be calculated by varying the frequency of laser 39 over different calibration cycles.

In one embodiment, a separate calibration procedure is performed with LCOS 17 so as to reduce the optical flicker experienced on LCOS 17. Optical flicker is detected as a ripple in power of the detected monitor beam 29 and is more easily detected by certain phase images produced by LCOS 17. As an example, by applying a ramp image function to reference region 41 with a greater than $2\pi$ phase change, the detected monitor beam is sensitive to the power ripple. By iteratively adjusting the common voltage applied to LCOS 17 until the ripple is minimized, the optical flicker can be substantially reduced.

Use of monitor 27 is able to be time multiplexed for separate use in determining the MEMS mirror angle to calibrate in the switching plane, calibrating LCOS 17 for control in the dispersion plane and detecting and reducing optical flicker.

Higher Order Mode Suppression

In dynamically routing optical beams through WSS 1, the steering functions applied to LCOS 17 inherently also couple diffraction orders higher than the zero order through the optical system. If these higher orders are not sufficiently suppressed, they can couple to nearby fibers and give rise to optical interference in the form of cross-talk. Two particular higher diffraction orders that contribute most to cross-talk are the −1 diffraction order and the +2 diffraction order. By applying certain attenuation patterns on LCOS 17, it is possible to efficiently suppress the −1 order robustly over a wide range of operating conditions. Suppression of the +2 order, however, is more difficult due primarily to the presence of unwanted double-pass orders which are phase sensitive to optical elements such as the top glass thickness of LCOS 17. The tight control of the beam positions provided by the above described locked calibration system provides a solution for allowing the greater suppression of the +2 diffraction order mode.

Figure 11:
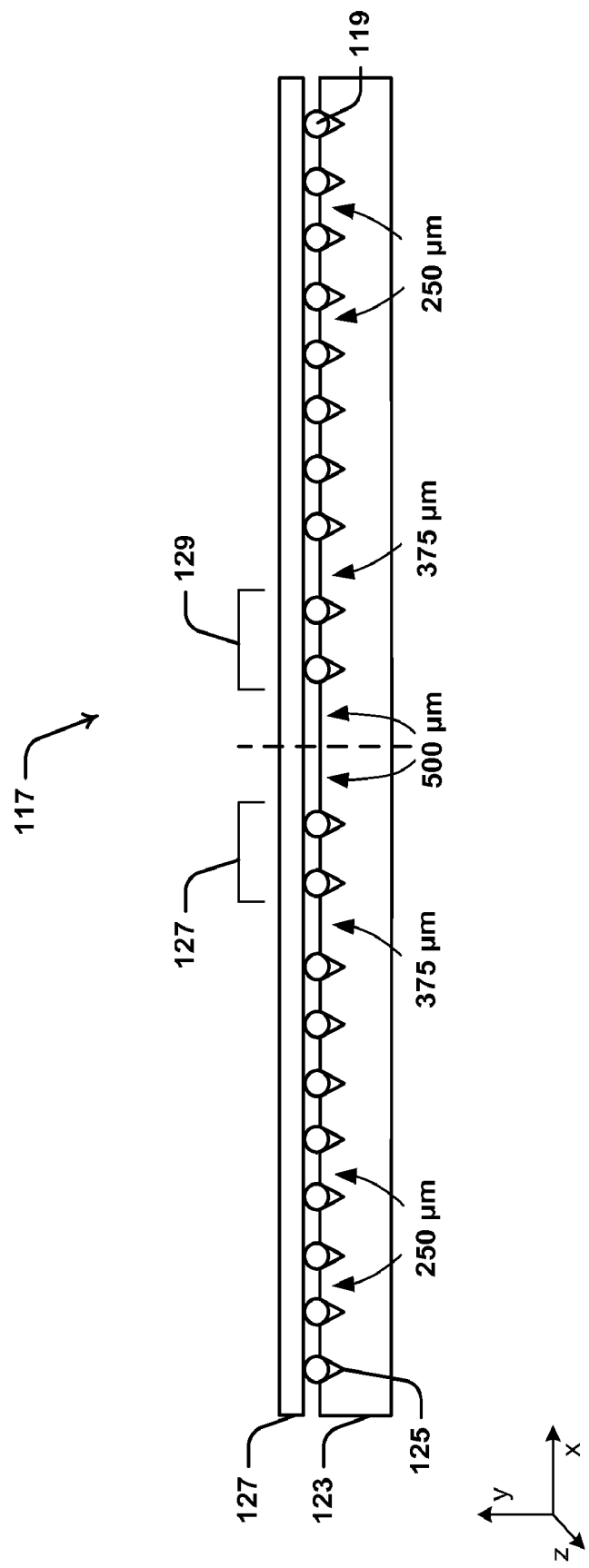
FIG. 11 is a schematic front view of a fiber v-groove array for maintaining a plurality of optical fibers in a predetermined array.

Referring to FIG. 11, there is illustrated a schematic front view of a fiber v-groove array 117 for maintaining up to twenty optical fibers, e.g. 119. The fibers are disposed about a central axis 121. Axis 121 is defined as a point of symmetry of an optical trajectory between input and output fibers when LCOS 17 provides no steering in the switching plane. The position of axis 121 is controlled by the tilt angle of MEMS 55.

V-groove array 117 includes a lower mounting portion 123 having a plurality of spaced apart v-shaped grooves 125 for receiving optical fibers. V-groove array 117 also includes an upper clamping portion 127 for securely engaging the optical fibers in their respective v-shaped grooves. Mounting portion 123 and clamping portion 127 are selectively releasably engagable to secure the fibers in their respective grooves.

The majority of the fibers are equally spaced 250 μm apart. However, arbitrary pairs of fibers 127 and 129 on each side of axis 121 are spaced apart by 375 μm. In other embodiments, other fiber spacings are used. The fibers are disposed in an array about axis 121 and begin at a distance of 500 μm from axis 121. This particular arrangement of fibers ensures that, with proper beam control using locked calibration system 25, the +2 diffraction orders of wavelength channels directed to the add/drop ports fall between the respective fibers and do not significantly contribute to cross-talk.

Locked calibration system 25 is able to monitor and adjust the relative position, in the switching plane, of the diffraction orders for specific wavelength channels by applying a background ramp function to cells of LCOS 17 corresponding to those specific channels. This ramp function is applied in conjunction with the current switching state to apply a correction or calibration to the optical beam trajectories. By suitable calibration using MEMS 55 and LCOS 17, locked calibration system 25 is able to collocate the various diffraction orders for the various wavelength channels so that unwanted orders are incident between the fiber ports.

Conclusions

It will be appreciated that embodiments of the present invention provide a calibration system for a wavelength selective switch.

The present invention provides a technique for dynamically adjusting the alignment of optical beams within the optical train of a WSS device to compensate for aberrations and variations to the beams. The compensation is provided by the dynamic calibration of the wavelength-to-pixel mapping during operation of the WSS. In order to achieve this compensation, a wavelength reference laser is used to find mapping of wavelength-to-pixel during the lifetime of the WSS. This wavelength-to-pixel mapping is then used by optical algorithms to calibrate the images drawn in the LCOS to dynamically compensate for wavelength shifts. In some embodiments, the channel registration error is contained to less than about 1.5 GHz. In the case of dual source type WSS devices, the described calibration techniques can also account for imperfections between the two sources.

The combination of fiber array symmetry and the described calibration techniques provides for controlling the position of all diffraction orders and, in particular, ensuring that no direct coupling goes to +2 diffraction orders which suffer from deleterious effects in the presence of unwanted low level reflections.

The more accurate stability provided by the above described active feedback locked calibration system allows the structural thermal and mechanical stability requirements of the wavelength selective switch to be relaxed. In some embodiments, only the LCOS device is temperature controlled and aberrations from the remaining optical elements are compensated actively using the locked calibration system. By relaxing the temperature control of the WSS, the thickness of the mounting substrate can be reduced substantially. This inherently reduces the overall profile of the packaged device and reduces material costs.

Although discussed in relation to a specific WSS device 1, it will be appreciated that locked calibration system 25 is also applicable to other types of WSS.

Interpretation

Throughout this specification, use of the term "element" is intended to mean either a single unitary component or a collection of components that combine to perform a specific function or purpose.

Throughout this specification, use of the term "orthogonal" is used to refer to a 90° difference in orientation when expressed in a Jones vector format or in a Cartesian coordinate system. Similarly, reference to a 90° rotation is interpreted to mean a rotation into an orthogonal state.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies and processes described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

I claim:

1. A calibration system for a wavelength selective switch, the switch being adapted for dynamically switching optical beams along respective trajectories between input and output ports disposed in an array using a reconfigurable spatial light modulator device, the system including:

a monitor for the projection of an optical monitor beam through at least a portion of the wavelength selective switch onto a predefined region of the spatial light modulator, the monitor further including a controller for electrically controlling cells within the predefined region to selectively direct the optical monitor beam along a monitoring trajectory relative to a switching trajectory, the monitor further providing for a detection of the optical monitor beam reflected from the spatial light modulator device and, in response, providing a calibration signal; and an active correction unit responsive to the calibration signal for applying a correction to one or more of the trajectories.

2. The calibration system according to claim 1 wherein the same correction is applied simultaneously to each of the respective trajectories.

3. The calibration system according to claim 1 wherein the correction includes a predefined spatial offset of the optical beams at the output ports.

4. The calibration system according to claim 3 wherein the spatial offset of the optical beams is in a switching dimension being a direction of switching by the spatial light modulator device.

5. The calibration system according to claim 1 wherein the active correction unit provides control to a beam switching module including:

an electrically controllable mirror tiltable at a number of predefined angles; and an optical power element having a focal length f and being positioned at a distance f from both the array of input and output ports and the mirror to convert an angular correction of the trajectories to a corresponding spatial offset in a dimension of the array.

6. The calibration system according to claim 1 wherein the active correction unit includes a control for the spatial light modulator for selectively modifying a background slope image while maintaining the current switching state.

7. The calibration system according to claim 1 wherein the monitor beam is projected from a first monitor port in the array and received in a second monitor port in the array.

8. The calibration system according to claim 7 wherein the first and second monitor ports are the same port.

9. The calibration system according to claim 1 wherein the monitor includes:

a light source for directing the monitor beam onto the predetermined region;

the controller for electrically controlling cells within the predefined region to selectively direct the monitor beam along a monitoring trajectory relative to a switching trajectory; and a detector for detecting the optical power of the beam directed along the monitoring trajectory.

10. The calibration system according to claim 9 wherein the light source produces a monitor beam having a predetermined wavelength.

11. The calibration system according to claim 10 wherein the light source is a wavelength locked laser.

12. The calibration system according to claim 11 wherein the light source includes a tunable element for selectively defining the predetermined wavelength of the monitor beam.

13. The calibration system according to claim 1 wherein the predefined region is located in a peripheral region of the spatial light modulator.

14. The calibration system according to claim 1 wherein the spatial light modulator is an LCOS device.

15. The calibration system according to claim 1 wherein the active correction unit applies the correction to the one or more trajectories while maintaining a constant switching state in the spatial light modulator.

16. A monitor device for a wavelength selective switch, the switch being adapted for dynamically switching optical beams along respective trajectories between input and output ports disposed in an array using a reconfigurable liquid crystal spatial light modulator device, the monitor including:

a monitor for monitoring predetermined characteristics of one or more of the optical beams, the monitor comprising a light source for directing an optical monitor beam onto a predetermined region, a controller for electrically controlling cells within the predefined region to selectively direct the optical monitor beam along a monitoring trajectory relative to a switching trajectory, and a detector for detecting an optical power of the optical monitor beam directed along the monitoring trajectory; and an active feedback controller responsive to the monitor for simultaneously correcting for more than one of a beam alignment, wavelength position and liquid crystal optical flicker.

17. A calibration system for monitoring the operation of a pixelated optical phased array structure, the system including:

a first laser for projecting a reference signal onto a portion of the pixelated optical phased array structure, a sensor for monitoring a return reference signal from a first portion of the pixelated optical phased array structure so as to provide a sensed return signal, a control system for adjustment of a position of phase patterns on a second portion of the pixelated optical phased array structure based on the sensed return signal.

18. The calibration system according to claim 17 wherein the pixelated optical phased array structure forms part of an optical system having a series of input/output ports, an optical dispersion device and optical power elements and wherein an input signal from the input/output ports is projected through each of the optical dispersion device and optical power elements.

19. The calibration system according to claim 17 wherein the input signal is incident onto the pixelated optical phased array structure in a first region and the reference signal is incident onto the pixelated optical phased array structure in a second region separate to the first region.

20. The calibration system according to claim 17 wherein the first laser is tunable.

* * * * *